July 29, 1947. W. H. WEDGER 2,424,869
STIFFENING PORTIONS OF THE UPPERS OF SHOES
Filed April 14, 1941
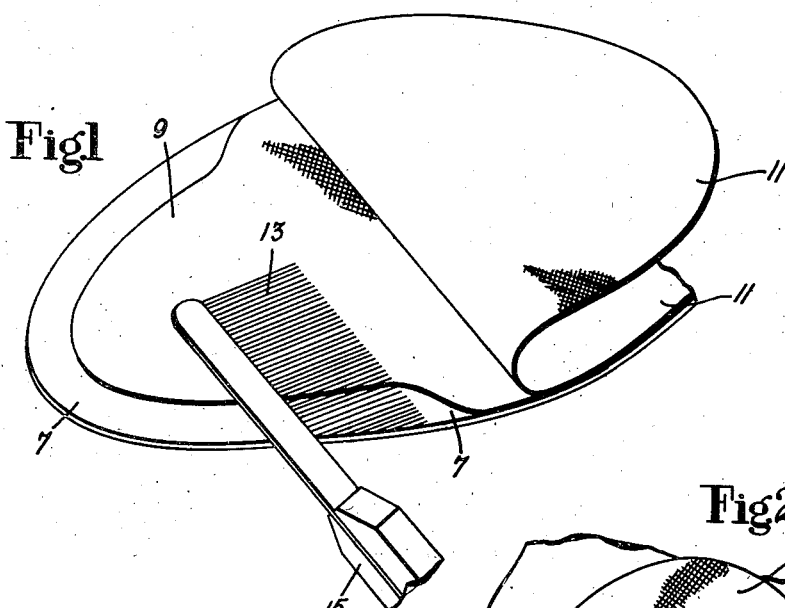
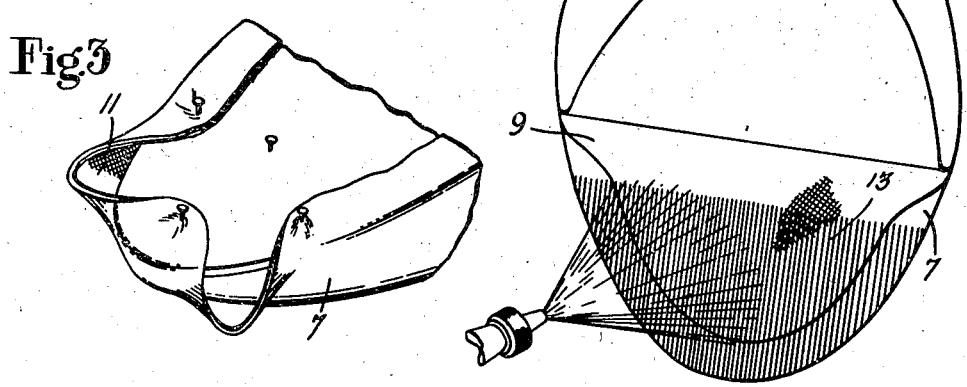
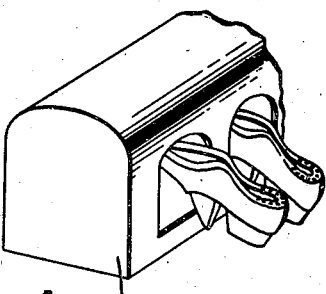
INVENTOR Patented July 29, 1947

2,424,869

UNITED STATES PATENT OFFICE 2,424,869

STIFFENING PORTIONS OF THE UPPERS OF SHOES

Walter H. Wedger, Newton Center, Mass., assignor to United Shoe Machinery Corporation, Flemington, N. J., a corporation of New Jersey Application April 14, 1941, Serial No. 388,398

30 Claims. (Cl. 36—77)

This invention relates to the manufacture of boots and shoes and more particularly to the stiffening of certain parts of the upper, for example the toe portion.

In the manufacture of a shoe, it is common to stiffen the toe portion of the upper, by means of a stiffener blank impregnated with a stiffening substance such as Celluloid, paste, rosin, etc., such a stiffener being softened by a solvent or by heat to render it pliable before it is placed in the upper of a shoe and conformed, together with the upper, to the last.

According to the present invention the stiffening of a selected portion of the upper is accomplished by means of an aminoplast stiffening substance which results from the partial reaction of certain compounds containing an NH$_2$ group with an aldehyde. Such stiffening substance results, for example from the partial reaction of urea, thiourea, melamine, or dicyandiamide with an aldehyde, preferably in aqueous solution, the reaction being stopped with the product uncured. The addition to such an uncured product, the pH value of which has been properly adjusted to stabilize it, of a curing agent, which is commonly an acidifying agent, will cause polymerization or further polymerization to take place so that the final product when dry will be not only hard but cured and resistant to water.

The term "aminoplast stiffening substance," as used herein, denotes a product which results from the partial reaction of a substance containing an NH$_2$ group linked to carbon, such as urea, thiourea, melamine, dicyandiamide and derivatives of these substances with an aldehyde, the product, upon being acidified, being capable of curing to a hard, water-resistant resin. In the preparation of such aminoplast stiffening substances, the partial reaction is one of addition or addition plus partial condensation polymerization. After the addition reaction, the products may be stabilized and used as such. Alternatively, the addition products may be partially polymerized and then stabilized. In the final cure the addition products, or the partially polymerized products, are polymerized or condensed to a hard, water-resistant resin. The aminoplast stiffening substance may be any one of such partial reaction products or a mixture of any of them.

When the reaction between the compound containing the NH$_2$ group and the aldehyde is stopped, the partial reaction product is water-soluble, and in the case of the ureas the solution can readily be stabilized by adjusting the pH value. The solution of the melamine partial reaction product is not so readily stabilized; and commonly this partial reaction product is sold in the form of a stable water-soluble powder, a suitable product being put out by the American Cyanamid Company under the trade name of "Melmac S-77 V." The solution of the dicyandiamide partial reaction product is also not readily stabilized. In the case of any of the substances mentioned above, the reaction with the aldehyde may be carried to a point in which the partial reaction product is either considerably less soluble or is insoluble in water, and, provided that the reaction has not been carried too far, the product will still be usable in the manner in which a solution is used as described in detail below. Alternatively, if the partial reaction products are not readily available, they may be made in a known manner by reacting urea, melamine, etc. with an aldehyde. The methods by which these partial reaction products are made form no part of the present invention which is concerned entirely with said products.

The preferred material, which is put out by the American Cyanamid Company under the trade name of "Beetle Syrup No. 250 conc., an aqueous solution of the partial reaction product of urea and formaldehyde containing 70% solids and having a pH value of about 7, is in a convenient form to be used; and the other partial reaction products may readily be made into a solution or suspension or a combination of the two having the same solid content. In the further description of the invention, including the formulas, such a solution or suspension of an aminoplast stiffening substance will be referred to as "resin syrup."

According to the preferred procedure a viscous water solution or syrup of an aminoplast stiffening substance is mixed with a toughening substance, such for example as emulsified nitrocellulose, and with a filler, preferably a protein, such for example as ground hair; and the resultant pasty mass, which constitutes the stiffening material, is incorporated in a selected locality of the upper of a shoe, for example by being applied to the toe portion of one or another of the layers of the laminated upper of a shoe, there being also applied to the same or to an adjacent layer a curing agent which will cause polymerization or further polymerization of the aminoplast stiffening substance to take place so that the stiffening substance, when dry, will be not only hard but cured and resistant to moisture. The upper is conformed to the last while the stiffening substance is in its soft water-soluble form and is maintained upon the last until the said substance has cured and dried and has become converted into its water-resistant form. The selected locality of the upper is thus stiffened with a hard, resilient, water-resistant substance.

Although in the above preferred procedure the stiffening material and the curing agent are applied to one or another of the layers of the laminated upper, it should be understood that a similar procedure but involving the use of a separate stiffener blank may be used if desired.

Referring to the accompanying drawing,

Fig. 1 is a perspective of a portion of the toe end of the upper of a shoe, the stiffening material being in process of being applied to the toe portion of the doubler by means of a spatula;

Fig. 2 is a plan of the same portion of the upper showing the application of the curing agent in the form of a spray;

Fig. 3 is a perspective of the toe portion of the upper after it has been pulled over;

Fig. 4 is a perspective of a toe heater showing two lasted shoes in process of having their toe portions heated to hasten the curing and drying of the stiffening material; and Fig. 5 is a plan of a toe stiffener blank to which the stiffening material and a curing agent have been applied, said blank being ready to be inserted in the toe portion of the upper of a shoe.

The resin syrup, which is in its intermediate uncured stage, is preferably mixed with a filler, an alkali and a toughening agent to form the stiffening material ready to be applied to a shoe part. An example of a suitable stiffening material is as follows:

| | Parts by weight |
|---|---|
| Resin syrup (70% solids) | 200 |
| Triethanolamine | 4 |
| Nitrocellulose emulsion | 120 |
| Ground horse hair | 75 |

The first three substances are mixed together and then the filler is mixed in. The ground horse hair imparts resilience to the stiffening material in its finished cured form. The alkali is a stabilizer and neutralizes to the desired degree the acidity of the filler. The nitrocellulose is a toughening agent which increases the flexibility of the cured resin.

The nitrocellulose emulsion may be made by first preparing two solutions as follows:

No. 1

| | Av. oz. |
|---|---|
| Film scrap solution (15% solids) | 17 |
| Dibutyl phthalate | 1 |

No. 2

| | Fl. oz. |
|---|---|
| Methyl cellulose solution (2½% solids) | 2 |
| Duponol solution | 10 |

The Duponol solution consists of 21 grams Duponol M. E. Dry and 1 fluid ounce sulphonated castor oil (monopole) made up to one gallon with water. Nos. 1 and 2 are mixed and put through a homogenizer. The nitrocellulose emulsion need not be made separately. If desired the proper amounts of Nos. 1 and 2 above may be mixed with the resin syrup and put through a homogenizer; or the nitrocellulose may be dissolved in a solvent which is not miscible with water and the solution stirred into the resin syrup and the whole put through a homogenizer, water being added if desired to adjust the solid content. In any case, however, a nitrocellulose emulsion results; and the stiffening material ready to be used to impregnate or coat a shoe part is a thick, sticky, pasty mass.

Although the preferred ingredients of the stiffening material have been named above by way of illustration, it should be understood that various substitutions of ingredients which have the same or similar properties may be made. Examples of such substitutions are as follows. As toughening substance there may be used other plastic, amorphous, film-forming substances such as polyvinyl acetate, ethyl cellulose, asphalt, cellulose acetate, chlorinated rubber, and n-butyl methacrylate. As stabilizer there may be used trisodium phosphate, sodium borate and piperidine. As filler there may be used finely divided, inert substances such as various kinds of ground hair, leather dust, ground slate, walnut shell flour, cellulose, and finely divided asbestos.

As toughening agents there may also be used, either in place of the nitrocellulose or with it, certain substances such, for example, as polymerized ethylene oxide of a molecular weight of from 1500 to 4000 or an alkyd resin such as an oil-modified reaction product of phthalic anhydride and glycerine.

An example of a suitable stiffening material containing this mixture of alkyd resin and aminoplast stiffening substance is as follows:

| | Parts by weight |
|---|---|
| Mixture of alkyd resin solution and aminoplast resin syrup | 200 |
| Triethanolamine | 4 |
| Water | 40 |
| Ground horse hair | 75 |

In making the mixture of alkyd resin and aminoplast resin syrup, a solution of the alkyd resin in a solvent such as toluol is stirred into the resin syrup and water to emulsify the alkyd resin, and then the pH value is adjusted to make the mixture properly alkaline.

As has been stated, nitrocellulose emulsion may also be used if desired. An example is as follows:

| | Parts by weight |
|---|---|
| Mixture of alkyd resin and aminoplast resin syrup | 200 |
| Nitrocellulose emulsion | 120 |
| Triethanolamine | 4 |
| Ground horse hair | 75 |

Here the alkyd resin is emulsified when it is stirred into the aminoplast resin syrup and the nitrocellulose emulsion.

Examples of suitable formulas which include polymerized ethylene oxide, a water-soluble substance, are as follows:

| | Parts by weight |
|---|---|
| Resin syrup (70% solids) | 200 |
| Polymerized ethylene oxide | 50 |
| Triethanolamine | 4 |
| Ground horse hair | 75 |

| | Parts by weight |
|---|---|
| Resin syrup (70% solids) | 200 |
| Polymerized ethylene oxide | 50 |
| Nitrocellulose emulsion | 120 |
| Triethanolamine | 4 |
| Ground horse hair | 75 |

The pasty stiffening material is applied to a selected portion of the upper of a shoe, for example to the toe portion of the doubler, to which, or to an adjacent layer, is also applied an agent which will cause the aminoplast stiffening substance to cure upon standing or more quickly upon being heated. A suitable agent is an aqueous solution of an ammonium salt, such as ammonium chloride which reduces the pH value of the substance.

The method of stiffening the toe portion of the upper may be carried out in different ways, depending to some extent upon the construction of the upper itself. Ordinarily, an upper comprises an outer or display part and an inner or hidden part, the latter part consisting sometimes, of a lining only but usually of a lining and a doubler. Assuming that the assembled upper comprises a vamp 7, a doubler 9 and a lining 11, the stiffening material 13 is forced into and through the doubler, which may have its margin cut away as shown, so that, when the toe portion is lasted, there will not be surplus material to form objectionable bunches or wrinkles. The upper, at this time, may be already assembled together with an insole upon a last. The forcing of the stiffening material into and through the doubler may be accomplished in any convenient manner. For example, this may be accomplished by placing the toe portion of the upper upon a flat support with the vamp down and the toe portion of the lining pulled back, as shown in Fig. 1, and forcing the pasty stiffening material 13 into and through the doubler by means of a spatula 15. The application of the stiffening material in this manner causes it to impregnate the doubler thoroughly and to cause some of the material to pass through the doubler. Consequently, when the upper is pulled over and lasted, the toe portion of the vamp, the doubler and the lining are thoroughly bonded together. The curing agent may be applied, as shown in Fig. 2, by spraying a solution of a substance such as ammonium chloride upon the doubler and the exposed margin of the vamp, if the margin of the doubler has been cut away.

Conveniently, the application of the curing agent and the application of the resinous stiffening material will be made just before the pulling over operation by which the conforming of the upper to the last is initiated as shown in Fig. 3, the final conforming of the upper taking place during the subsequent lasting operation. The toe portion of the doubler, treated with the resinous pasty mass described above and with the curing agent, will remain workable during the time which elapses in common shoe-factory practice until the shoe is lasted. After the lasting operation, the toe portion of the lasted shoe is subjected to heat for an interval, for example in a heater 17 as shown in Fig. 4, to hasten the drying and the cure of the stiffening substance. There results a stiffened toe portion of the upper which is hard, resilient and water-resistant.

This hastening of the cure of the stiffening substance is desirable for several reasons. It permits the last to be removed as soon as desired. It prevents the hold-downs or other members of machines, which engage the top of the forepart of the upper and apply pressure to it, from marking the upper as they might do if the stiffening substance were soft. Moreover, in the lasting of a shoe there are commonly formed wrinkles in the toe portion which must be later ironed out. The shrinking of the stiffening substance tends to remove these wrinkles; and this shrinking effect is greater in the case in which the toe portion is heated to cure the substance and to drive out the water quickly.

In shoes which have no doubler the lining is sometimes a fairly heavy fabric with a napped side which is adjacent to the leather upper. In such case the stiffening material may be applied to the napped side of the lining without causing difficulty by striking through the lining sufficiently to cause the lining to adhere to the last. If the lining has not sufficient body to hold the stiffening material without danger of having it strike through, a tip-doubler of fabric may be used between the toe portion of the lining and the leather upper, or some sort of protective substance such, for example, as powdered chalk may be applied to the toe portion of the last to prevent the lining from sticking to the last.

The stiffening material and the curing agent may be incorporated in the assembled upper in various manners. As has been stated, the preferred manner is to incorporate both in the doubler or in two adjacent layers. It is possible, however, to make use of a separate blank which is inserted between layers of the upper, in which case the blank may carry both the stiffening material and the curing agent or only one of these two substances. In the latter case, the other of the two substances will be carried by a layer of the upper. In Fig. 5 there is shown a toe-stiffener blank comprising a porous fabric impregnated with the pasty stiffening material 13 and treated with a curing agent. The blank thus prepared is immediately inserted in the toe portion of an assembled upper and the manufacture of the shoe proceeded with, as has been described above, including the pulling over and lasting operations and the heating of the toe portion of the lasted shoe to hasten the drying and curing of the stiffening substance.

It may be noted that the immediate effect of the curing agent is to change the pH value of the resin syrup and that the melamine resin syrup will cure without the addition of the curing agent, although it is preferable to add such agent since the curing then takes place more rapidly.

Although the invention has been set forth in connection with the stiffening of the toe portion of the upper of a shoe by the use of a material which includes, in addition to the aminoplast substance, a filler and a toughening substance, it should be understood that the invention is not limited to the stiffening of any particular portion of the upper nor to the use of a toughening substance or a filler.

Other aspects of the method of stiffening portions of the uppers of shoes are claimed in my copending divisional application Serial No. 758,677, filed on July 2, 1947.

Having thus described my invention, what I claim as new and desire to secure by Letters Patent of the United States is:

1. The method of stiffening a portion of the upper of a shoe, said method comprising incorporating in a selected locality of the upper an aminoplast stiffening substance in uncured form in a liquid vehicle, a curing agent capable of causing the substance to be converted into a form which, when dry, is hard and water-resistant, an emulsified plastic, amorphous, film-forming toughening substance and a finely divided, inert filler, imparting to the selected locality of the upper the desired shape, and maintaining said shape while the stiffening substance hardens.

2. The method of stiffening a portion of the upper of a shoe, said method comprising incorporating in a selected locality of the upper an aminoplast stiffening substance in uncured form in a liquid vehicle, a curing agent capable of causing the substance to be converted into a form which, when dry, is hard and water-resistant, an emulsified toughening substance and a finely divided, inert filler, imparting to the selected locality of the upper the desired shape, and maintaining said shape while the stiffening substance hardens.

3. The method of stiffening a portion of the upper of a shoe, said method comprising incorporating in a selected locality of the upper an aminoplast stiffening substance in uncured form in a liquid vehicle and a curing agent capable of causing the stiffening substance to be converted into a form which, when dry, is hard and water-resistant, imparting to the selected locality of the upper the desired shape, and maintaining said shape while the substance hardens.

4. The method of stiffening a portion of the upper of a shoe, said method comprising incorporating in a selected locality of the upper an aminoplast stiffening substance in uncured form in a liquid vehicle, an emulsified toughening substance and a curing agent capable of causing the stiffening substance to be converted into a form which, when dry, is hard and water-resistant, imparting to the selected locality of the upper the desired shape, and maintaining said shape while the substance hardens.

5. The method of stiffening a portion of the upper of a shoe, said method comprising incorporating in a selected locality of the upper an aminoplast stiffening substance in uncured form in a liquid vehicle, a curing agent capable of causing the stiffening substance to be converted into a form which, when dry, is hard and water-resistant and a finely divided, inert filler, imparting to the selected locality of the upper the desired shape, and maintaining said shape while the substance hardens.

6. The method of stiffening a portion of the upper of a shoe, said method comprising incorporating in a selected locality of the upper an aminoplast stiffening substance in uncured form in a liquid vehicle, a curing agent capable of causing the stiffening substance to be converted into a form which, when dry, is hard and water-resistant and a protein filler, imparting to the selected locality of the upper the desired shape, and maintaining said shape while the substance hardens.

7. The method of stiffening a portion of the upper of a shoe, said method comprising forcing into and through a shoe part a pasty material comprising an aminoplast stiffening substance in uncured form in a liquid vehicle, supplying a curing agent, imparting to the shoe part the desired shape, and maintaining said shape while the resin cures.

8. The method of stiffening a portion of the upper of a shoe, said method comprising incorporating in a selected locality of the upper a urea resin in uncured form in a liquid vehicle, a curing agent capable of causing the resin to be converted into a form which, when dry, is hard and water-resistant and an emulsified toughening substance, imparting to the selected locality of the upper the desired shape, and maintaining said shape while the resin hardens.

9. The method of stiffening a portion of the upper of a shoe, said method comprising incorporating in a selected locality of the upper a melamine resin in uncured form in a liquid vehicle, a curing agent capable of causing the resin to be converted into a form which, when dry, is hard and water-resistant and an emulsified toughening substance, imparting to the selected locality of the upper the desired shape, and maintaining said shape while the resin hardens.

10. The method of stiffening a portion of the upper of a shoe, said method comprising incorporating in a selected locality of the upper a urea resin in uncured form in a liquid vehicle, a curing agent capable of causing the resin to be converted into a form which, when dry, is hard and water-resistant and a finely divided, inert filler, imparting to the selected locality of the upper the desired shape, and maintaining said shape while the resin hardens.

11. The method of stiffening a portion of the upper of a shoe, said method comprising incorporating in a selected locality of the upper a melamine resin in uncured form in a liquid vehicle, a curing agent capable of causing the resin to be converted into a form which, when dry, is hard and water-resistant and a finely divided, inert filler, imparting to the selected locality of the upper the desired shape, and maintaining said shape while the resin hardens.

12. The method of stiffening a portion of the upper of a shoe, said method comprising incorporating in a selected locality of the upper a urea resin in uncured form in a liquid vehicle, a curing agent capable of causing the resin to be converted into a form which, when dry, is hard and water-resistant, an emulsified toughening substance and a finely divided, inert filler, imparting to the selected locality of the upper the desired shape, and maintaining said shape while the resin hardens.

13. The method of stiffening a portion of the upper of a shoe, said method comprising incorporating in a selected locality of the upper a melamine resin in uncured form in a liquid vehicle, a curing agent capable of causing the resin to be converted into a form which, when dry, is hard and water-resistant, an emulsified toughening substance and a finely divided, inert filler, imparting to the selected locality of the upper the desired shape, and maintaining said shape while the resin hardens.

14. The method of stiffening a portion of the upper of a shoe, said method comprising incorporating in a selected locality of the upper a urea resin in uncured form, a curing agent capable of causing the resin to be converted into a form which, when dry, is hard and water-resistant, emulsified nitrocellulose and finely divided hair, imparting to the selected locality of the upper the desired shape, and maintaining said shape while the resin hardens.

15. The method of stiffening a portion of the upper of a shoe, said method comprising incorporating in a selected locality of the upper a melamine resin in uncured form, a curing agent capable of causing the resin to be converted into a form which, when dry, is hard and water-resistant, emulsified nitrocellulose and finely divided hair, imparting to the selected locality of the upper the desired shape, and maintaining said shape while the resin hardens.

16. A step-product comprising a pliable stiffener blank adapted to be incorporated in a selected locality of a shoe upper, said blank carrying an uncured aminoplast stiffening substance in a liquid vehicle, a finely divided, inert filler and an agent which will cause the resin to cure.

17. A shoe upper ready to be conformed to a last, a selected portion of the upper having incorporated therein a stiffening material comprising an aminoplast stiffening substance in a liquid vehicle, a finely divided, inert filler and a curing agent.

18. A shoe upper ready to be conformed to a last, a selected portion of the upper having incorporated therein a stiffening material comprising an uncured aminoplast stiffening substance in a liquid vehicle, an emulsified toughening substance, a finely divided, inert filler and a curing agent.

19. The method of stiffening a portion of the upper of a shoe, said method comprising incorporating in a selected locality of the upper a partially reacted melamine-aldehyde compound in an aqueous vehicle, said compound being capable of being converted into a hard, resilient, water-resistant resin, imparting to the selected locality the desired shape, and maintaining said shape while the conversion takes place.

20. The method of stiffening a selected portion of the upper of a shoe, said method comprising incorporating in a fabric lining member of an upper an aqueous solution of an aminoplast stiffening substance in uncured form, a curing agent capable of causing the substance to be converted into a form which, when dry, is hard and water-resistant, an emulsified toughening substance and a finely divided, inert filler, imparting to the selected portion of the upper the desired shape, and maintaining said shape while the stiffening substance hardens.

21. The method of stiffening a selected portion of the upper of a shoe, said method comprising incorporating in a fabric lining member of an upper an aqueous solution of an aminoplast stiffening substance in uncured form, a curing agent capable of causing the substance to be converted into a form which, when dry, is hard and water-resistant, an emulsified toughening substance and a protein filler, imparting to the selected portion of the upper the desired shape, and maintaining said shape while the stiffening substance hardens.

22. The method of stiffening a selected portion of the upper of a shoe which comprises applying to a lining member of the upper a pasty material including a viscous solution of an aminoplast stiffening substance, a curing agent capable of causing the stiffening substance to be converted into a form which, when dry, is hard and water-resistant, an emulsified toughening substance and a finely divided, inert filler imparting to the selected locality of the upper the desired shape while the stiffening substance hardens.

23. The method of stiffening a selected portion of the upper of a shoe which comprises applying to a lining member of the upper a pasty material including a viscous solution of an aminoplast stiffening substance, a curing agent capable of causing the stiffening substance to be converted into a form which, when dry, is hard and water-resistant, an emulsified toughening substance and a protein filler imparting to the selected locality of the upper the desired shape and maintaining said shape while the stiffening substance hardens.

24. The method of stiffening a portion of the upper of a shoe, said method comprising incorporating in a selected locality of the upper an aqueous solution of an incompletely polymerized resin and a curing agent adapted to change the pH value of the resin solution and to cause the polymerization to proceed and the resin to become hard and water resistant, said incompletely polymerized resin being chosen from a class consisting of the partial reaction products of urea, thiourea, melamine, dicyandiamide and derivatives of these substances with an aldehyde, imparting to the selected locality of the upper the desired shape, and maintaining said shape while the resin hardens.

25. The method of stiffening a portion of the upper of a shoe, said method comprising incorporating in a selected locality of the upper an aqueous solution of an incompletely polymerized resin, said incompletely polymerized resin being chosen from a class consisting of the partial reaction products of urea, thiourea, melamine, dicyandiamide and derivatives of these substances with an aldehyde, a curing agent adapted to change the pH value of the resin solution and to cause the polymerization to proceed and to cause the resin, when dry, to become hard and water-resistant and an emulsion of a plastic, amorphous, film-forming toughening substance, imparting to the selected locality of the upper the desired shape, and maintaining said shape while the resin hardens.

26. The method of stiffening a portion of the upper of a shoe, said method comprising incorporating in a selected locality of the upper an aqueous solution of an incompletely polymerized resin, said incompletely polymerized resin being chosen from a class consisting of the partial reaction products of urea, thiourea, melamine, dicyandiamide and derivatives of these substances with an aldehyde, a curing agent adapted to change the pH value of the resin solution and to cause the resin, when dry, to be hard and water-resistant, an emulsion of a plastic, amorphous, film-forming toughening substance and a finely divided inert filler, imparting to the selected locality of the upper the desired shape, and maintaining said shape while the resin hardens.

27. A lasted shoe having a portion to be stiffened, said portion carrying an aqueous solution of a synthetic resin chosen from a class consisting of urea-aldehyde resin, thiourea-aldehyde resin, melamine-aldehyde resin and dicyandiamide resin, the resin solution being acidic.

28. A shoe upper ready to be conformed to a last, a selected portion of the upper having incorporated therein an aqueous solution of a partially reacted urea-aldehyde resin, and a curing agent.

29. A shoe stiffener comprising a porous, absorbent, fibrous base impregnated with a reactive, water-soluble, aldehyde resin.

30. A shoe stiffener blank comprising a fibrous base carrying a synthetic resin chosen from the class consisting of reactive, water-soluble aldehyde resin, urea-aldehyde resin, thiourea-aldehyde resin, urea-aldehyde derivatives, and melamine-aldehyde resin.

WALTER H. WEDGER.

REFERENCES CITED

The following references are of record in the file of this patent:

UNITED STATES PATENTS

| Number | Name | Date |
|---|---|---|
| 2,104,692 | Cooke et al. | Jan. 4, 1938 |

FOREIGN PATENTS

| Number | Country | Date |
|---|---|---|
| 290,519 | Great Britain | May 16, 1928 |